United States Patent [19]

Kim

[11] Patent Number: 5,074,577
[45] Date of Patent: Dec. 24, 1991

[54] COMBINATION GOLF BAG AND SUPPORT AND ATTACHMENT MECHANISM

[76] Inventor: Young S. Kim, 22573 Woodridge Ct., Cupertino, Calif. 95014

[21] Appl. No.: 645,093

[22] Filed: Jan. 24, 1991

Related U.S. Application Data

[63] Continuation-in-part of Ser. No. 471,082, Jan. 26, 1990.

[51] Int. Cl.$^5$ .............................................. B62B 1/12
[52] U.S. Cl. ..................................... 280/646; 248/96; 280/47.26; 280/DIG. 6
[58] Field of Search ................... 248/96, 200.1, 221.4; 206/315.3, 315.7; 280/645, 646, 652, 47.24, 47.26, DIG. 6; 403/DIG. 4

[56] References Cited

U.S. PATENT DOCUMENTS

| | | | |
|---|---|---|---|
| 2,508,059 | 5/1950 | Burtt | 280/DIG. 6 X |
| 2,698,040 | 12/1954 | Wilkens | 280/DIG. 6 X |
| 2,725,240 | 11/1955 | Johnson, Jr. | 280/DIG. 6 X |
| 2,854,244 | 9/1958 | Jarmon | 280/DIG. 6 X |
| 3,666,221 | 5/1972 | Schliz | 248/96 |
| 4,792,152 | 12/1988 | Carolan | 280/DIG. 6 X |

*Primary Examiner*—Andres Kashnikow
*Assistant Examiner*—Michael Mar
*Attorney, Agent, or Firm*—Flehr, Hohbach, Test, Albritton & Herbert

[57] ABSTRACT

A system (10) including a soft-sided golf bag (12) and a cart (14) with an attachment mechanism (16) for fastening the bag (12) and cart (14) together. Also shown is a stand (18), which also fastenable to the golf bag (12) with the attachment mechanism (16). Attachment fixture (22) is riveted to base (20) with an upwardly open recess (24) to receive lower end (26) of support tube member (28). Fixture (32) is riveted to collar (30) with a downwardly open recess (34) facing toward the recess (24) in the attachment fixture (22). The recess (34) receives upper end (36) of support tube member (28) of the cart (14). Alternatively, the recesses (24) and (34) receive lower end (38) and upper end (40) of a corresponding support tube member (42) on the stand (18). The support tube members (28) and (42) are spring loaded. In operation, the golf bag (12) and the cart (14) or stand (18) are fastened together by inserting lower end (26) or (38) of the support member (28) or (42) of the cart (14) or stand (18) into the recess (24). By pressing down on the upper tube (44), the upper tube (44) and the lower tube (46) are compressed together sufficiently so that the upper end (36) or (40) of the support member (28) or (42) of the cart (14) or stand (18) can be positioned below the recess (34). The spring (56) is then allowed to move the end (36) or (40) into the recess (34), so that the cart (14) or stand (18) is fastened securely to the golf bag (12). To separate the cart (14) or stand (18), the sequence of steps is reversed.

8 Claims, 7 Drawing Sheets

COMBINATION GOLF BAG AND SUPPORT AND ATTACHMENT MECHANISM

CROSS REFERENCE TO RELATED APPLICATION

This application is a continuation-in-part of my pending application Ser. No. 07/471,082, filed Jan. 26, 1990 and entitled "Combination Golf Bag and Cart."

BACKGROUND OF THE INVENTION

1. Field of the Invention

The present invention relates generally to an attachment mechanism for attaching a golf bag to a cart or similar apparatus and to a golf bag and cart or similar apparatus incorporating the attachment mechanism. More particularly, it relates to such an attachment mechanism and a modular golf bag system incorporating the attachment mechanism.

2. Description of the Prior Art

In the standard approaches for fastening a golf bag and a golf cart together, the cart and the bag are either permanently fastened together, or they are fastened together with a bracket and strap. These approaches are shown, for example, in the prior art of record in the parent application, such as U.S. Pat. No. 4,522,299, issued June 11, 1985 to Clark et al. and U.S. Pat. No. 3,059,681, issued Oct. 23, 1962 to Lorbeski.

U.S. Pat. No. 2,647,762, issued Aug. 4, 1953 to Jamieson et al., also of record in the parent application, shows an attachment mechanism including a pair of encircling collars on a frame member of the cart and hooks on the golf bag for engaging the collars. Providing such hooks on the golf bag with sufficient strength to provide secure attachment requires installation of a metal strip inside the golf bag. There is a need for an attachment mechanism that is simpler in construction and provides a more secure releasable attachment between a golf bag and a cart or similar apparatus.

SUMMARY OF THE INVENTION

Accordingly, it is an object of this invention to provide an attachment mechanism for attaching a golf bag to a cart or similar apparatus and combination golf bag and supporting apparatus fastened together with the attachment mechanism that is simple in construction and provides a secure releasable attachment between the golf bag and the cart or other supporting apparatus.

It is another object of the invention to provide such an attachment mechanism and combination golf bag and supporting apparatus fastened together with the attachment mechanism that allows the bag to be easily attached and released from the supporting apparatus with one simple motion.

The attainment of these and related objects may be achieved through use of the novel attachment mechanism and combination cart and supporting apparatus fastened together with the attachment mechanism herein disclosed. A combination in accordance with this invention has a golf bag with an upper end and a lower end and a support apparatus for the golf bag. A mechanism for attaching the golf bag to the supporting apparatus includes a support tube member having an upper end and a lower end. The lower end of the golf bag has a first attachment fixture with an upwardly open recess positioned, dimensioned and configured to receive the lower end of the support tube member. The upper end of the golf bag has a second attachment fixture with a downwardly open recess positioned, dimensioned and configured to receive the upper end of the support tube member. The support tube member comprises first and second tubes with third and fourth ends intermediate the upper and lower ends of the support tube member. The first and second tubes are fastened to each other at the third and fourth ends and are longitudinally movable at the third and fourth ends with respect to one another a sufficient distance to allow insertion of one of the upper and lower ends of the support tube member into the recess of one of the first and second attachment fixtures with another of the upper and lower ends of the support tube member in the recess of another of the first and second attachment fixtures. A biasing member urges the first and second tubes apart from one another.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Turning now to the drawings, more particularly to FIGS. 1–4, there is shown a system 10 including a soft-sided golf bag 12 and a cart 14 with an attachment mechanism 16 for fastening the bag 12 and cart 14 together. Also shown is a stand 18, which also fastenable to the golf bag 12 with the attachment mechanism 16.

As shown, the golf bag 12 has a base 20, formed from a rigid plastic material, such as polypropylene. Attachment fixture 22 is riveted to the base 20 with an upwardly open recess 24 to receive lower end 26 of support tube member 28 (See also FIG. 6). Collar 30 of the golf bag 12 is similarly formed from polypropylene and has an fixture 32 riveted to the collar 30 with a downwardly open recess 34 facing toward the recess 24 in the attachment fixture 22. The recess 34 receives upper end 36 of the support tube member 28 of the cart 14. Alternatively, the recesses 24 and 34 receive lower end 38 and upper end 40 of a corresponding support tube member 42 on the stand 18.

Figure 5:
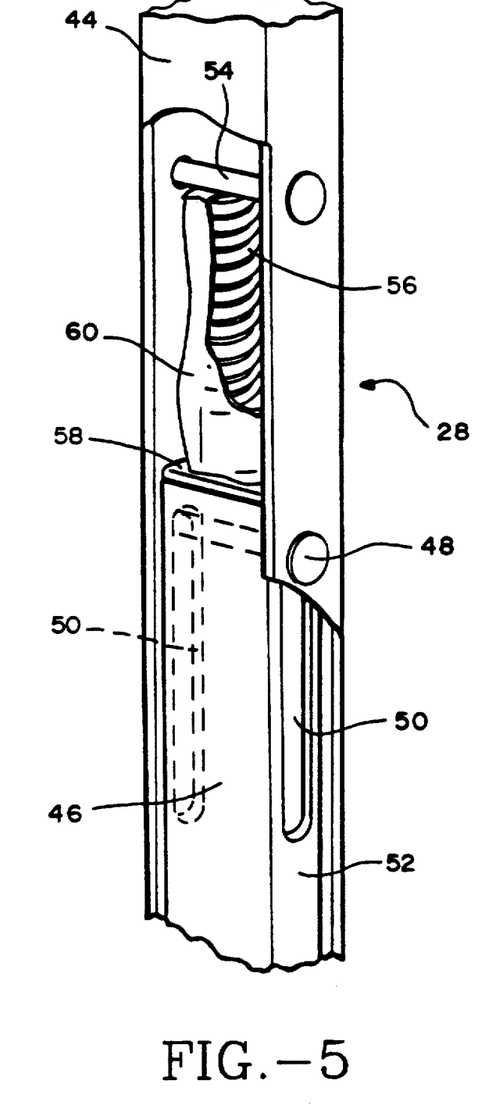
FIG. 5 is a perspective view of a portion of the attachment mechanism in FIGS. 1–4, with a partial cut away to show interior detail.

FIG. 5 shows that the support tube members 28 and 42 are spring loaded. An upper tube 44 is fastened to a lower tube 46 by means of a rod 48 passing through slots 50 on sides 52 of the lower tube 46. A similar rod 54 passes through the upper tube 44 to serve as a stop for spring 56. Spring 56 is also fastened to top 58 of the lower tube 46. The spring 56 is covered with a rubber or other resilient material sheath 60.

In operation, the golf bag 12 and the cart 14 or stand 18 are fastened together by inserting lower end 26 or 38 of the support member 28 or 42 of the cart 14 or stand 18 into the recess 24. By pressing down on the upper tube 44, the upper tube 44 and the lower tube 46 are compressed together sufficiently so that the upper end 36 or 40 of the support member 28 or 42 of the cart 14 or stand 18 can be positioned below the recess 34. The spring 56 is then allowed to move the end 36 or 40 into the recess 34, so that the cart 14 or stand 18 is fastened securely to the golf bag 12. To separate the cart 14 or stand 18, the sequence of steps is reversed. This attachment and removal is simple enough that it can be carried out with one hand.

Figure 6:
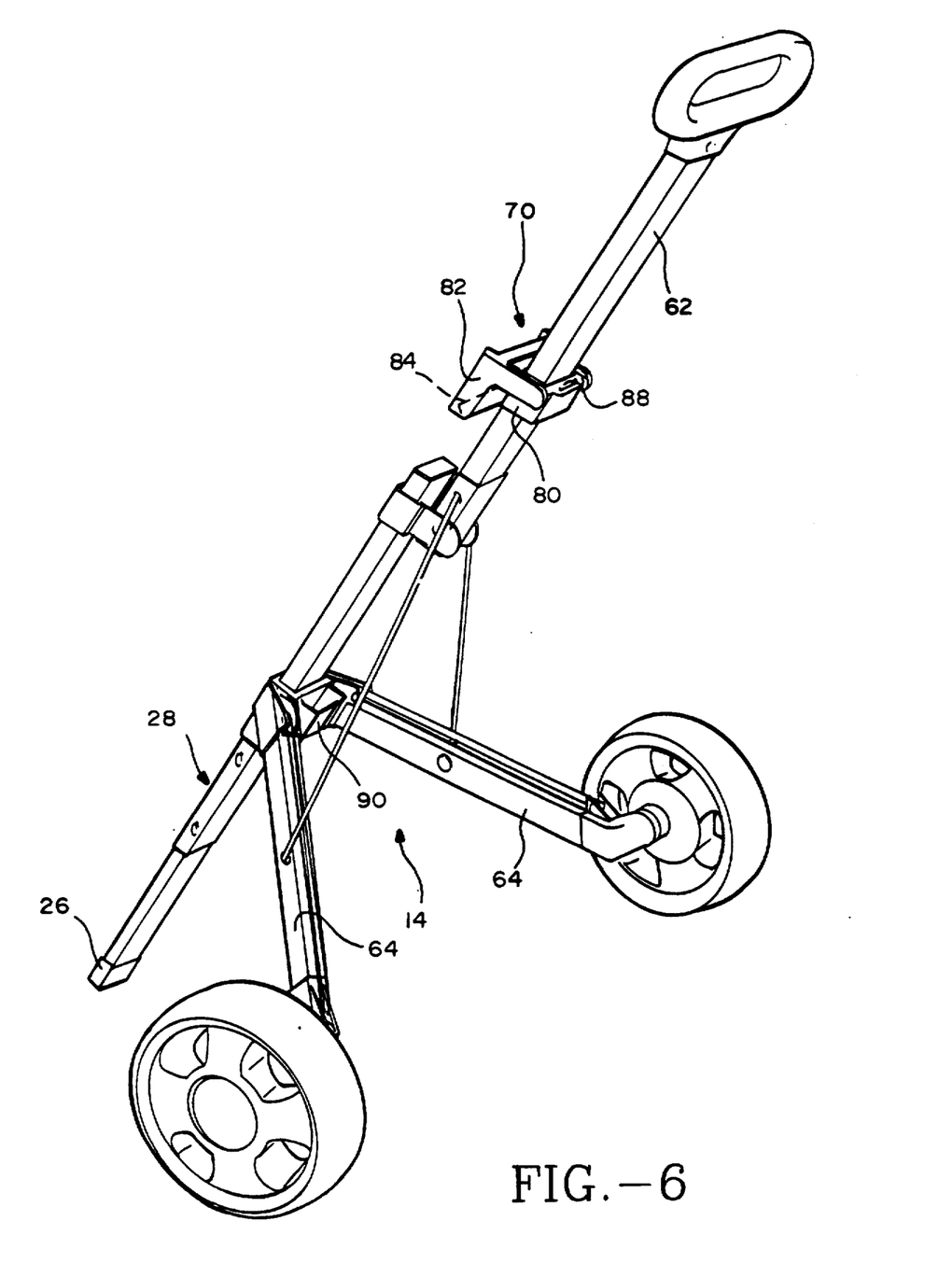
FIG. 6 is a perspective view of the cart in FIGS. 1 and 2 in its open position.
Figure 7:
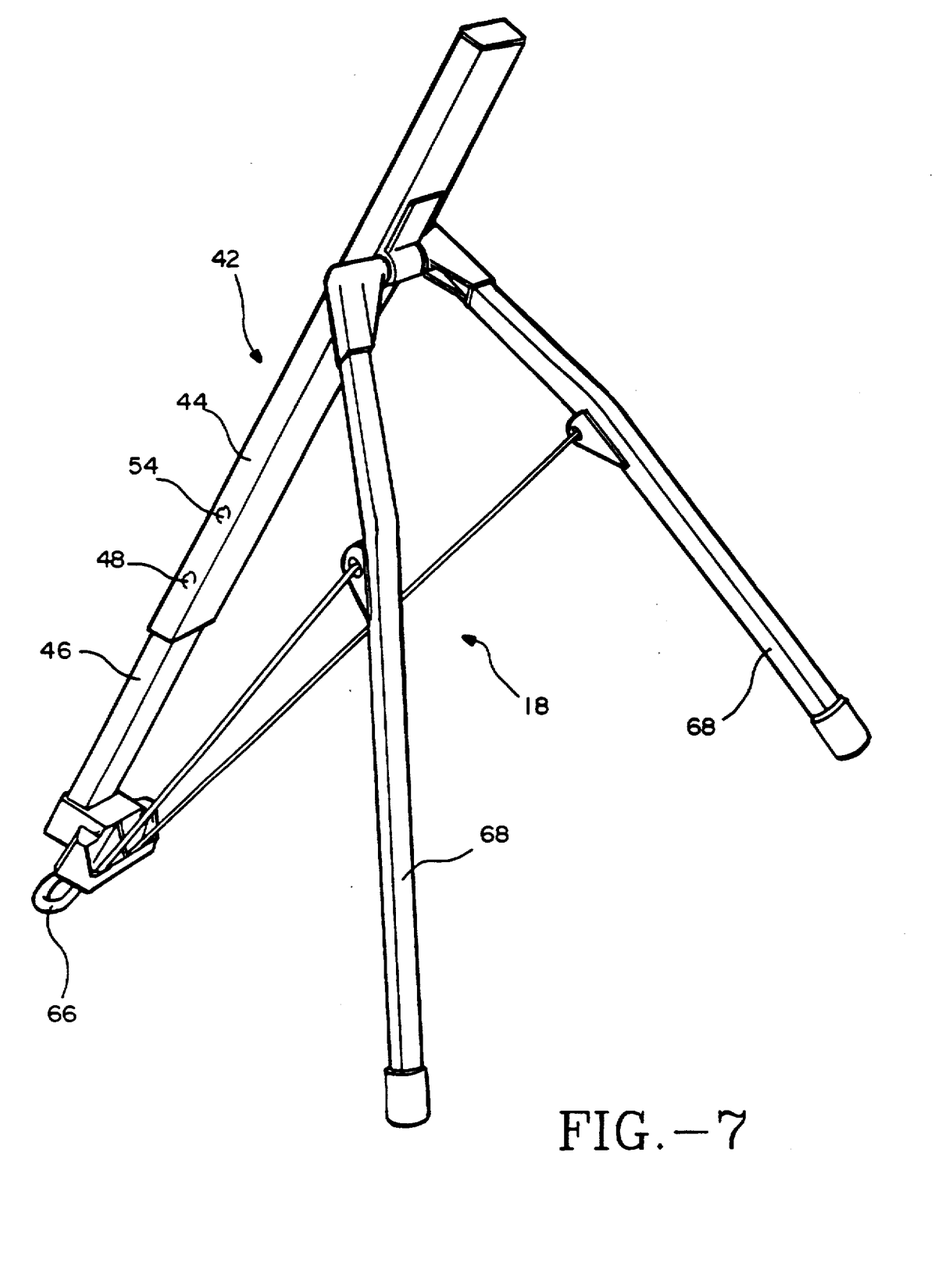
FIG. 7 is a perspective view of the support stand in FIGS. 3–4 in its open position.

The cart 14 and stand 18 are shown in their open positions in FIGS. 6 and 7. The cart 14 is opened by raising handle 62 to spread legs 64. The stand 18 is opened by pressing actuating member 66 against the ground or other hard surface to open legs 68. Since the opening mechanisms for the cart 14 and the stand 18 are conventional, they will not be described further.

Figure 1:
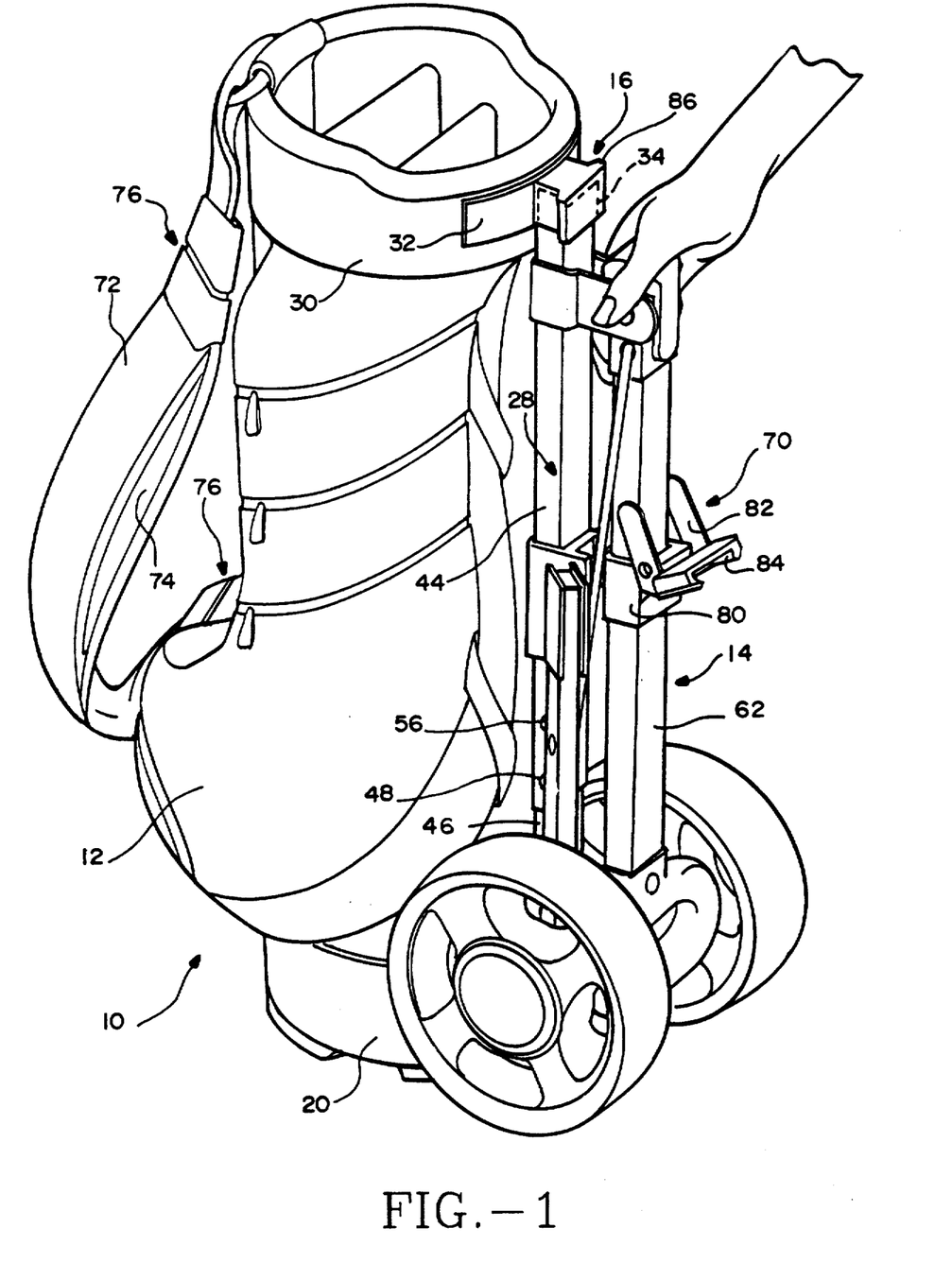
FIG. 1 is a perspective view of a golf bag and cart fastened together with the attachment mechanism of this invention.
Figure 2:
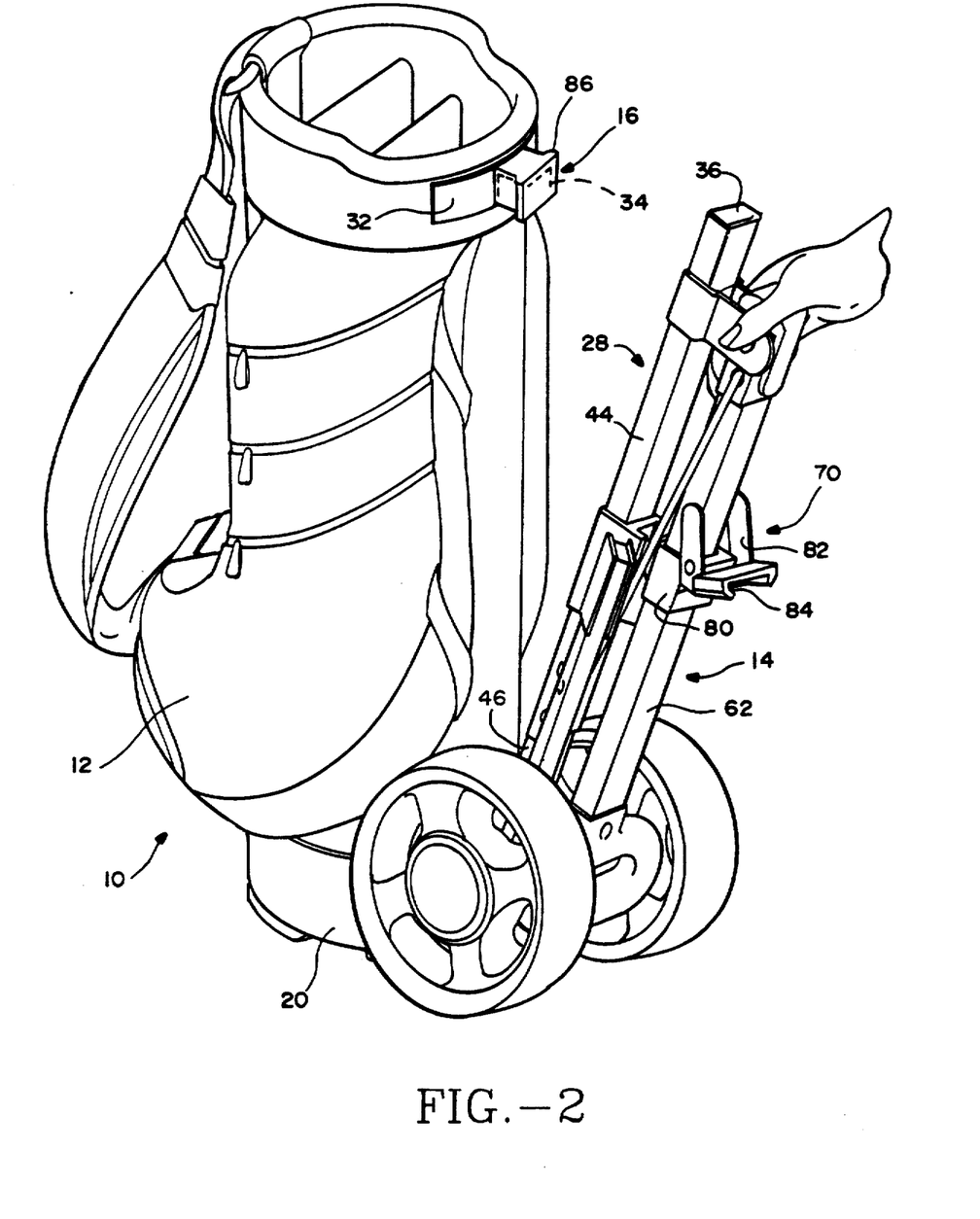
FIG. 2 a perspective view similar to FIG. 1, but showing the golf bag and cart with the attachment mechanism partially separated.
Figure 3:
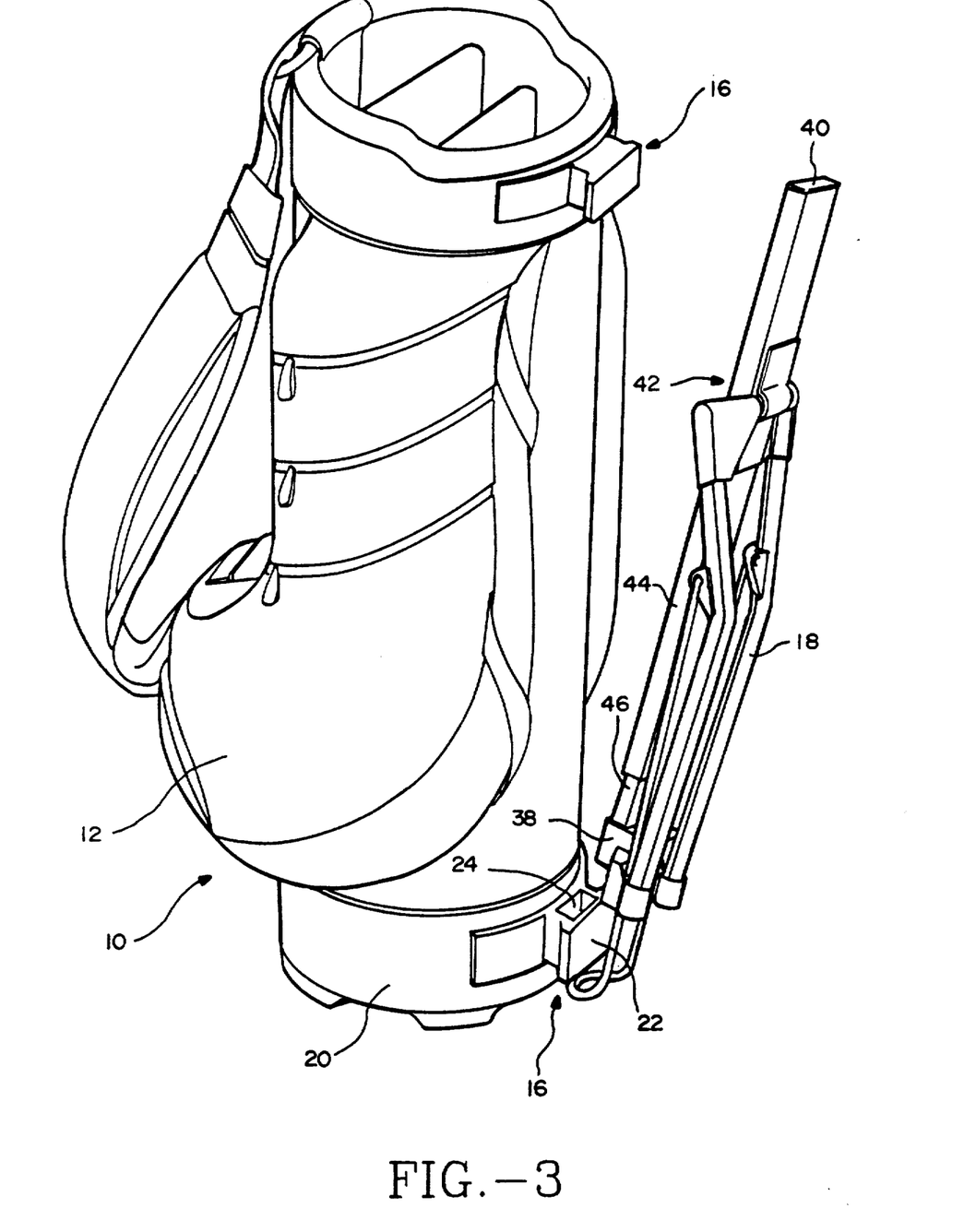
FIG. 3 is a perspective view similar to FIG. 2, but showing the golf bag and a support stand with the attachment mechanism partially separated.
Figure 4:
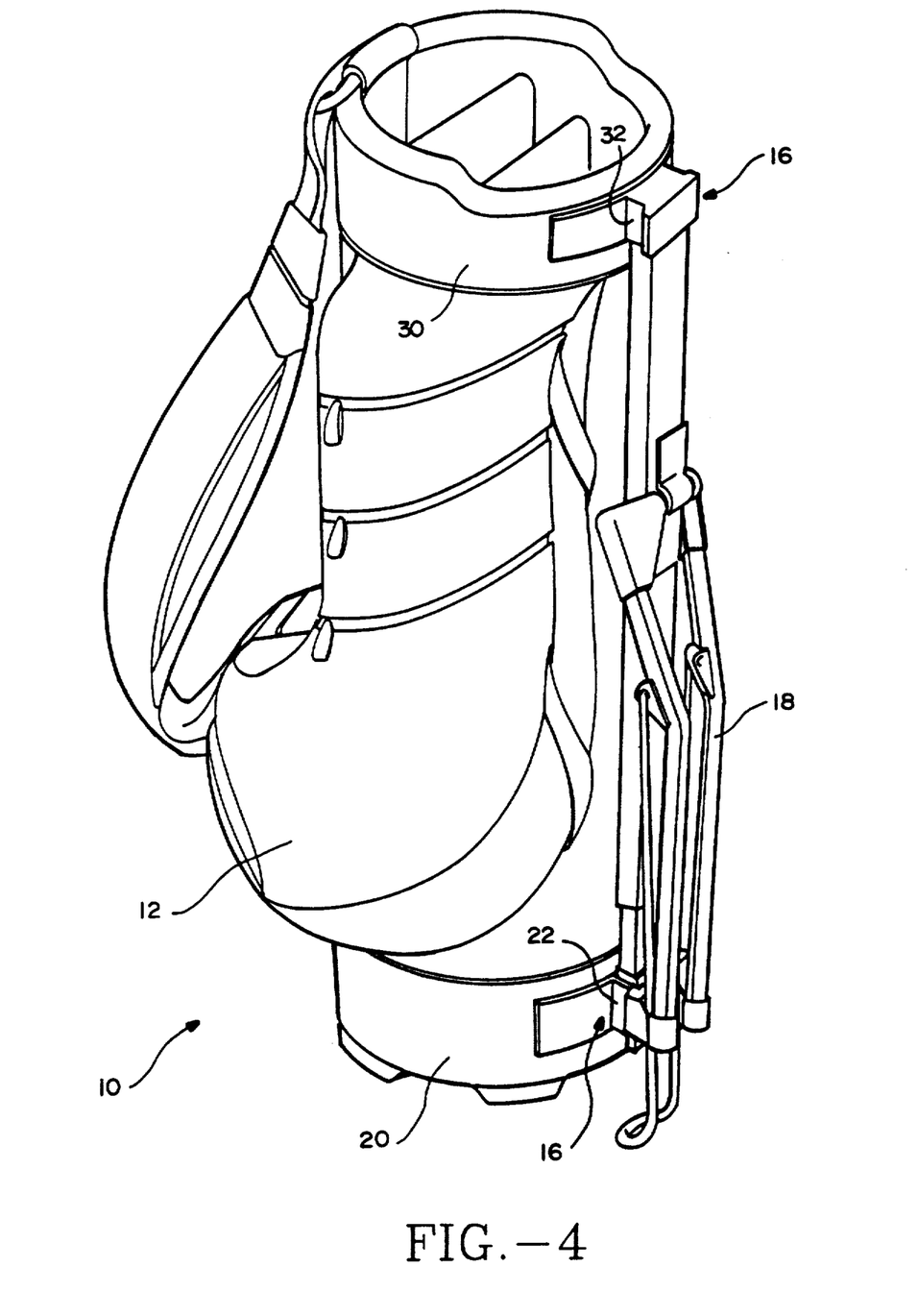
FIG. 4 is a perspective view of the golf bag and support stand of FIG. 3, but fastened together with the attachment mechanism.

The handle 62 of the cart 14 includes a mechanism 70 for locking the handle 62 in its upward and downward position, as shown in FIGS. 1-2 and 6, in order to keep the legs 64 from spreading or closing except when desired. The mechanism 70 includes a collar 80, slideably mounted on the handle 62 and a pivoting member 82, pivotally attached to the collar 80. When the handle 62 is in its raised position, as shown in FIG. 6, the pivoting member is pivoted so that slot 84 (see also FIGS. 1-2) will engage the upper attachment fixture 32 at 86 when the collar is moved down on the upwardly raised handle 62 with the cart 14 in place on the bag 14. In addition to holding the handle 62 in its raised position, the interaction of the slot 84 and the portion 86 of the attachment fixture 32 provides another attachment between the cart 14 and the bag 12 to assure that they remain together. The collar 80 also has a slot 88 which engages tongue 90 (see FIG. 6), when the collar 80 is moved down to the position shown in FIGS. 1-2 to hold the handle 62 in its downward position.

Figure 8:
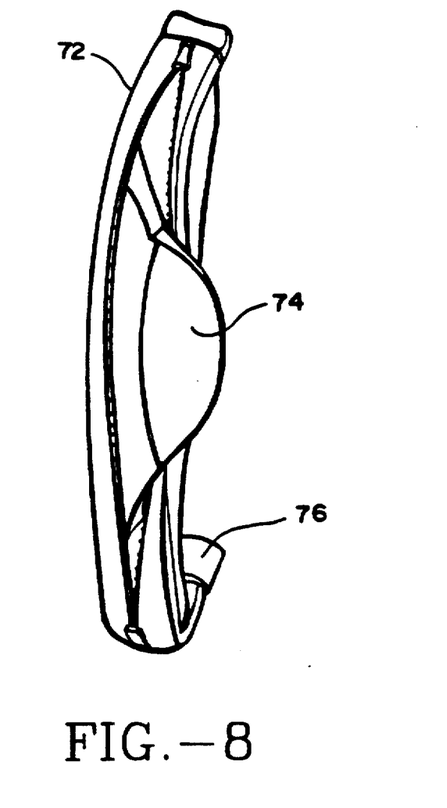
FIG. 8 is a perspective view of a portion of the golf bag shown in FIGS. 1–4.

The golf bag 12 includes a shoulder strap 72 having a pouch 74 for valuables and other small items (See also FIG. 8). The shoulder strap 72 is fastened to the golf bag 12 with conventional mating buckle fasteners 76, with the shoulder strap having a male buckle fastener at one end and a female buckle fastener at the other end. When the golfer is away from the golf bag 12, such as for a lunch break, the shoulder strap is removed from the golf bag 12 and worn as a fanny pack around the golfer's waist by fastening the buckle fasteners 76 together.

It should now be readily apparent to those skilled in the art that a novel combination golf bag and support and attachment mechanism for fastening the golf bag and the support together which is capable of achieving the stated objects has been provided. The attachment mechanism attaches a golf bag to a cart or similar apparatus and the resulting combination bag and supporting apparatus fastened together with the attachment mechanism is simple in construction and provides a secure releasable attachment between the golf bag and the cart or other supporting apparatus. The attachment mechanism and combination bag and supporting apparatus fastened together with the attachment mechanism allows the bag to be easily attached and released from the supporting apparatus with one simple motion, which can be performed with one hand.

It should further be apparent to those skilled in the art that various changes in form and details of the invention as shown and described may be made. It is intended that such changes be included within the spirit and scope of the claims appended hereto.

What is claimed is:

1. A combination comprising a golf bag having an upper end and a lower end, a ground engaging support apparatus for said golf bag, and an attachment mechanism for attaching said golf bag to said supporting apparatus, which comprises a support tube member having an upper tuber section, and a lower tube section, said upper tube section having an upper end said lower tube section having a lower end, the lower end of said golf bag having a first attachment fixture fixedly attached thereto with an upwardly open recess positioned, dimensioned and configured to receive and retain the lower end of said lower tube section, the upper end of said golf bag having a second attachment fixture fixedly attached thereto with a downwardly open recess positioned, dimensioned and configured to receive and retain the upper end of said upper tube section, said upper and lower tube sections having inner end portions, the inner end portion of one of said upper and lower tube sections being received within the other of said upper and lower tube sections, a biasing member for urging said upper and lower tube sections apart from one another, means for interconnecting said upper and lower tube sections while permitting relative longitudinal movement therebetween a sufficient distance to allow insertion of one of the upper and lower ends of said support tube member into the recess of one of said first and second attachment fixtures after the other one of the upper and lower ends of said support tube member has been inserted into the recess of the other one of said first and second attachment fixtures and means for attaching said attachment mechanism to said support apparatus, and a biasing member for urging said first and second tubes apart from one another.

2. The combination of claim 1 in which said support apparatus comprises a cart.

3. The combination of claim 1 in which said support apparatus comprises a stand.

4. The combination of claim 1 in which said biasing member comprises a spring connected between said upper and lower tube sections.

5. The combination of claim 1 in which said support apparatus comprises a cart having a handle movable between an upward position and a downward position, said combination additionally comprising a mechanism for locking said handle in the upward and downward positions.

6. The combination of claim 1 in which said mechanism for locking said handle comprises a first member slideably mounted on said handle and a second member pivotally attached to said first member, said first member having a portion for engaging a part of said cart to lock said handle in the downward position and said second member having a portion for engaging a part of said golf bag to lock said handle in the upward position.

7. The combination of claim 6 in which the part of said golf bag comprises said second attachment fixture.

8. The combination of claim 1 in which said golf bag has a shoulder strap with first and second buckle fixtures on first and second ends of said shoulder strap and a compartment between the first and second ends of said shoulder strap for holding articles, said first and second buckle fixtures attaching said shoulder strap to said golf bag, said first and second buckle fixtures being fastenable together to hold said shoulder strap around a waist of a user when said shoulder strap is removed from said golf bag.

* * * * *